United States Patent [19]
Cone

[11] Patent Number: 5,104,134
[45] Date of Patent: Apr. 14, 1992

[54] CHILD'S COMBINATION CARSEAT AND STROLLER

[75] Inventor: Richard E. Cone, Dayton, Ohio

[73] Assignee: Rainbow Roller Venture, Denver, Colo.

[21] Appl. No.: 551,319

[22] Filed: Jul. 12, 1990

[51] Int. Cl.⁵ .................................................. B62B 7/06
[52] U.S. Cl. .................................. 280/30; 280/643; 297/255
[58] Field of Search .................. 280/30, 639, 38, 39, 280/641, 642, 643, 657, 47.38; 297/130, 131, 250, 254, 255, DIG. 4

[56] References Cited

U.S. PATENT DOCUMENTS

| | | | |
|---|---|---|---|
| 3,290,050 | 12/1966 | Ezquerra | 280/30 |
| 4,620,711 | 11/1986 | Dick | 280/30 |
| 4,632,409 | 12/1986 | Hall et al. | 280/643 |
| 4,647,054 | 3/1987 | Chong | 280/643 |
| 4,679,804 | 7/1987 | Johnson | 280/643 |
| 4,685,688 | 8/1987 | Edwards | 280/643 |
| 4,762,331 | 8/1988 | Tucker et al. | 280/30 |
| 4,822,064 | 4/1989 | Hunter | 280/643 |
| 4,828,281 | 5/1989 | Sanchas | 280/30 |
| 4,872,692 | 10/1989 | Steenburg | 280/30 |
| 4,872,693 | 10/1989 | Kennel | 280/643 |
| 4,874,182 | 10/1989 | Clark | 280/30 |
| 4,878,680 | 11/1989 | Molnar | 280/30 |

Primary Examiner—Andres Kashnikow
Assistant Examiner—Richard Camby
Attorney, Agent, or Firm—John E. Reilly

[57] ABSTRACT

A convertible carseat/stroller is of the type having a molded plastic shell with lower door panels in the shell and a wheel assembly includes front and rear legs pivotally connected to a common support member within the shell and extensible between a downwardly divergent stroller position beneath the shell and upper retracted position within the shell under the control of a manual release member which is slidable along the support member for the wheel assembly. A handle unit is telescopically mounted with respect to the support member and is retractable into the shell when converted into a carseat. The door panels on the bottom of the shell follow movement of the wheel assembly so as to open in extending the wheel assembly between the shell for use as a stroller and will return to a closed position when the wheel assembly is retracted into the shell.

14 Claims, 4 Drawing Sheets

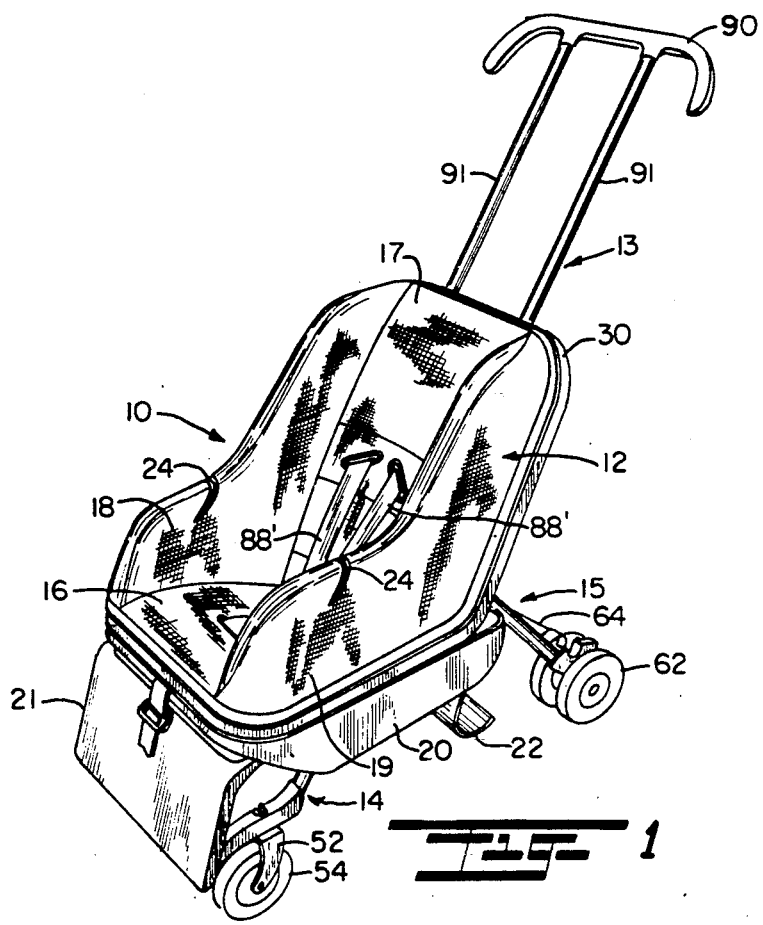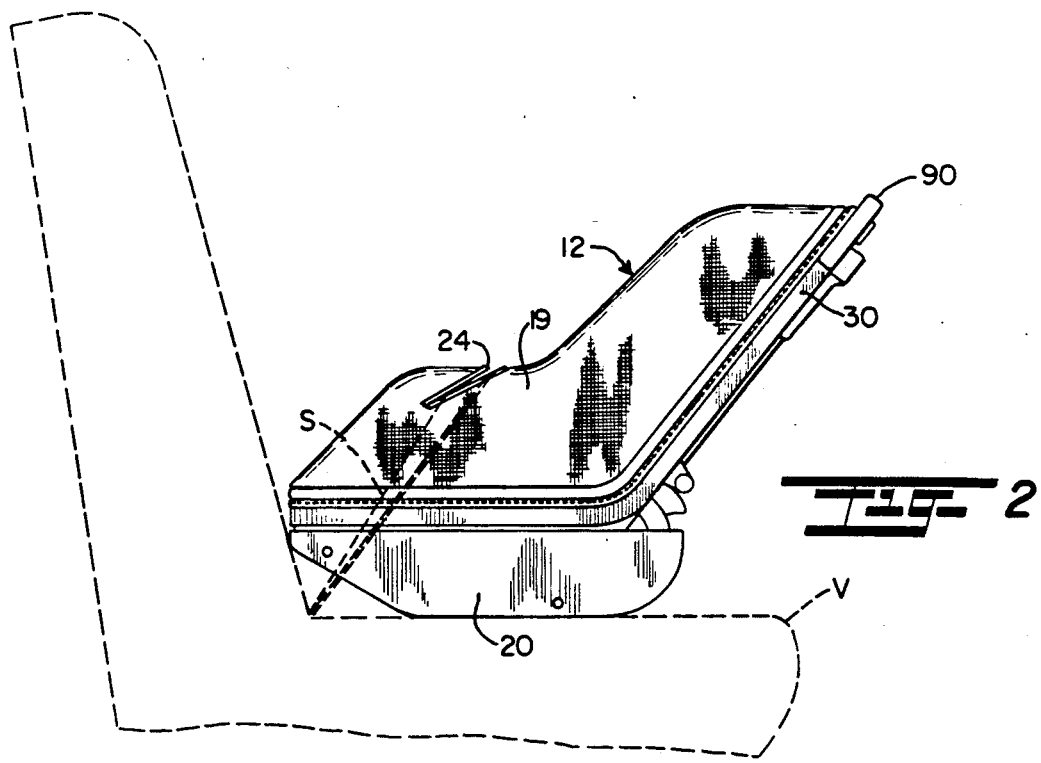

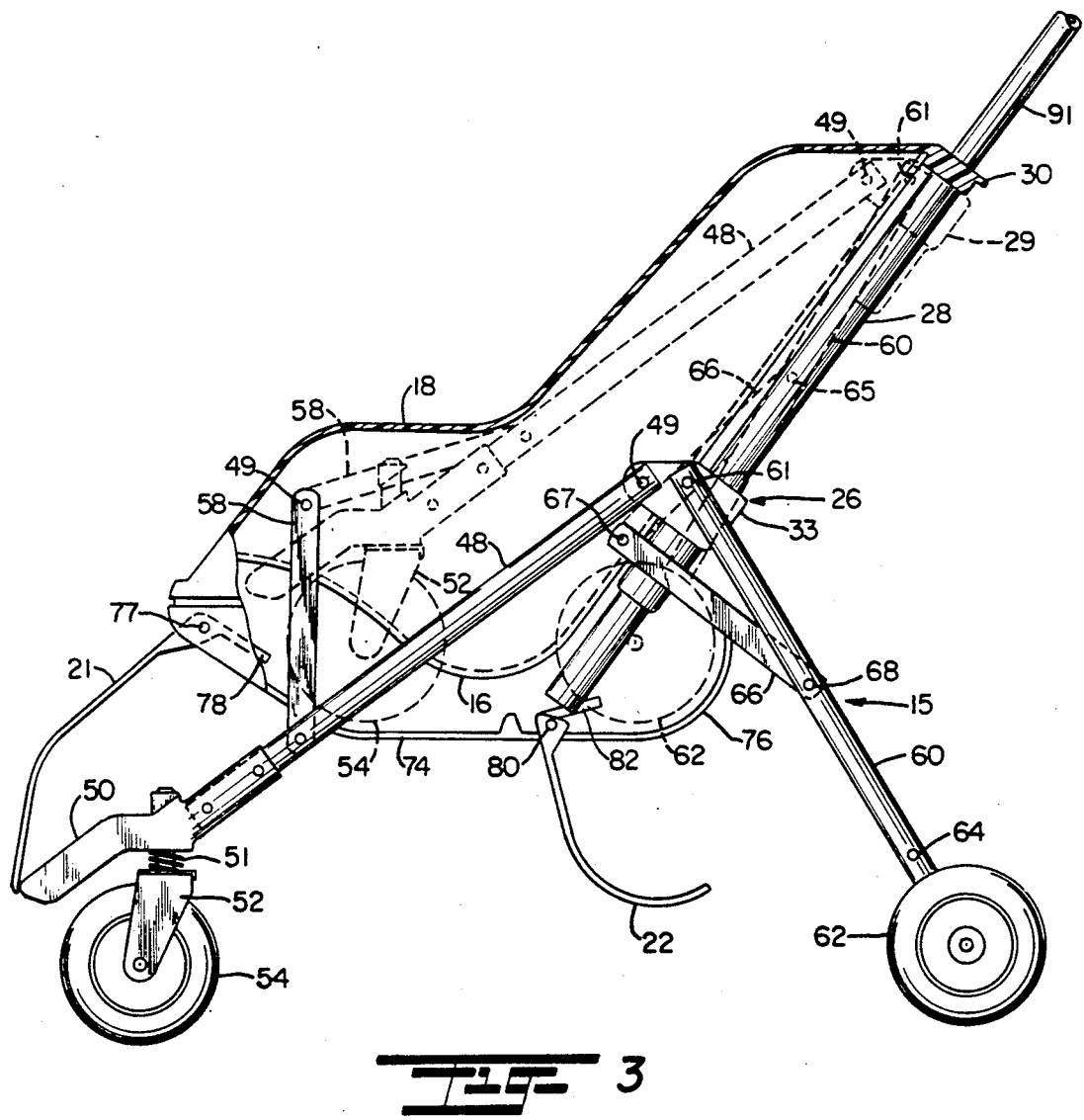

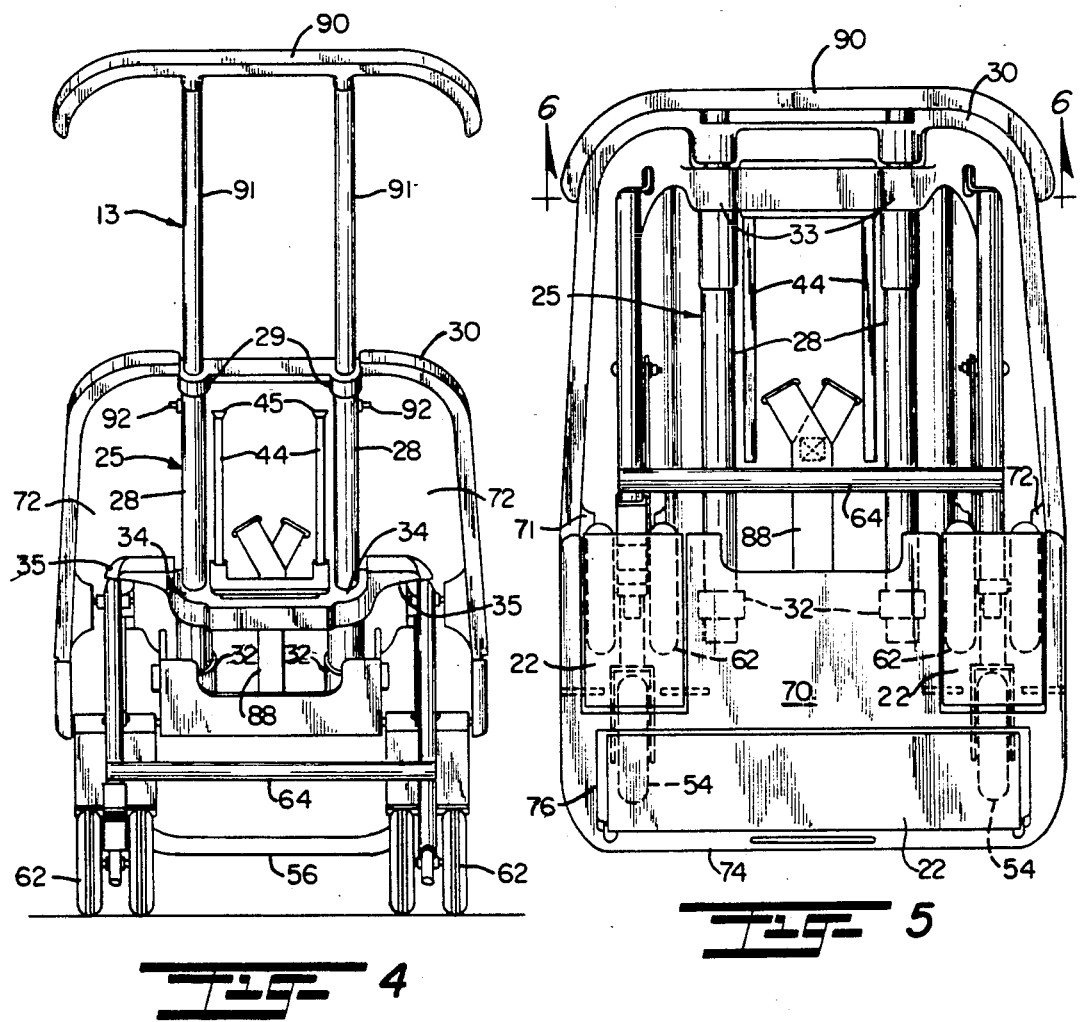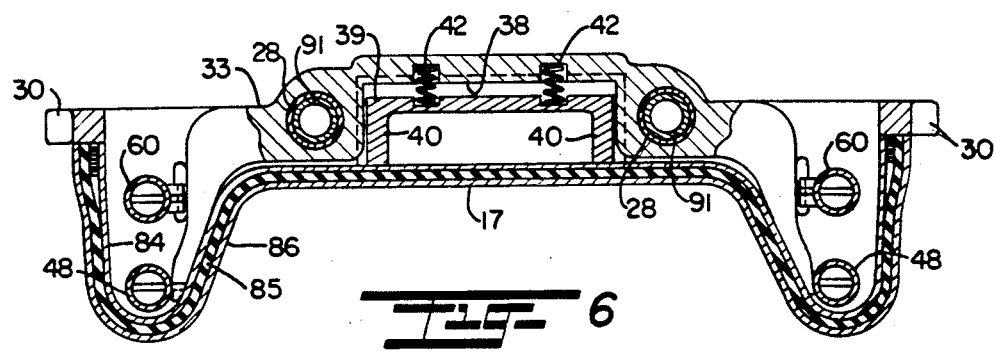

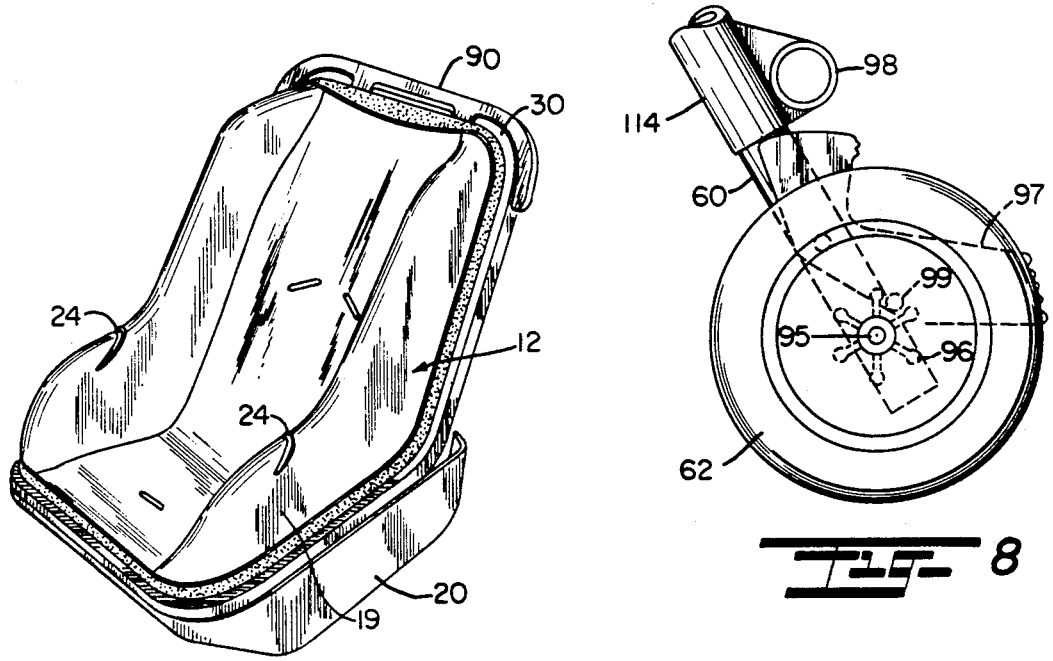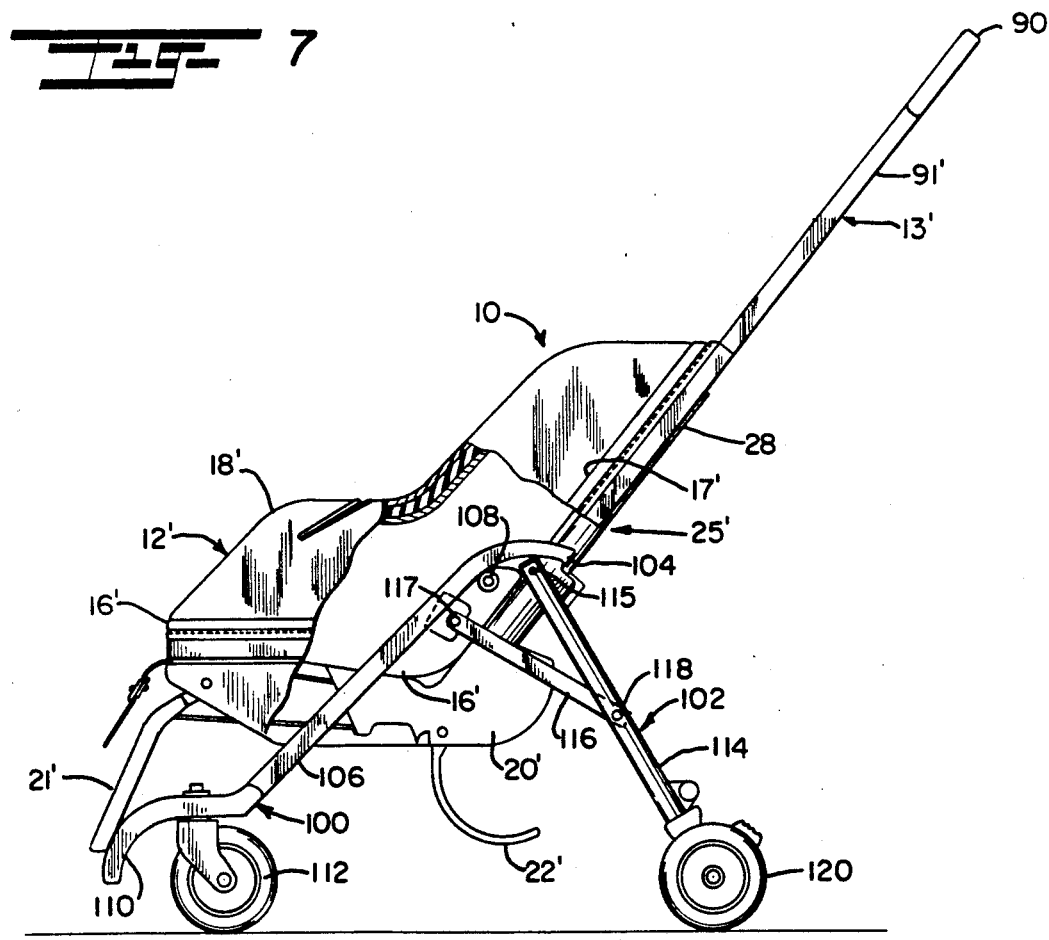

CHILD'S COMBINATION CARSEAT AND STROLLER

SPECIFICATION

This invention relates to child carriers; and more particularly relates to a novel and improved carrier of the type which can be converted into a carseat or stroller.

BACKGROUND AND FIELD OF THE INVENTION

Strollers have been devised which are convertible into carseats. Not only does this minimize the cost of having two separate types of conveyances but avoids the necessity of lifting and carrying a carseat and child over extended distances. Among other problems associated with the combination carseats and strollers now on the market are the number of parts, the complexity of construction and operation as well as being somewhat cumbersome and heavy.

A child carrier of the convertible type as disclosed in U.S. Letters Pat. No. 4,620,711 entitled MULTI-FUNCTION CHILD CARRIER and overcomes a number of the problems associated with child carriers as enumerated above. A particular feature of the MULTI-FUNCTION CHILD CARRIER was the ability to utilize the handle portions of the stroller as a support when converted into a carseat so as to space the wheels above the seat upon which the carseat was to rest and avoid soiling of staining of the vehicle seat. It is now proposed in accordance with the present invention to further reduce the number of parts required for a convertible carseat and stroller and at the same time to design a unit that is conformable for installation in a molded plastic shell customarily of the type used solely as a carseat. The following patents are representative of the present state of the art in this field. For example, U.S. Pat. No. 4,828,281 to Sanchas discloses a convertible stroller/carseat but which is basically of two-part construction in folding the wheels into the shell when not in use. U.S. Pat. No. 4,685,688 to Edwards is directed to a combination seat and stroller in which both the front and rear legs as well as the handle portions are telescopingly mounted with respect to a molded plastic shell and separate support tubes are required for telescoping movement of each of the front and rear legs into the retracted position along opposite sides of the shell. U.S. Pat. No. 4,872,693 to Kennel discloses a convertible stroller with a linkage mechanism to pivot the wheels into a retracted position when not in use. Also, U.S. Pat. No. 4,822,064 to Hunter discloses the combination of telescoping and pivotal movement of front and rear wheels with respect to a frame which includes an upper plastic shell defining a back and seat portion for the infant. In addition, the handle portion is telescopingly mounted in a tube for the rear wheel assembly. In U.S. Pat. No. 4,762,331 to Tucker, the front and rear wheels can be pivoted into a raised position at least partially hidden within a molded plastic shell.

Other representative patents in this field are U.S. Pat. No. 3,290,050 to Ezquerra, U.S. Pat. No. 4,632,409 to Hall et al, U.S. Pat. No. 4,679,804 to Johnson, U.S. Pat. No. 4,874,182 to Clark and U.S. Pat. No. 4,878,869 to Molnar.

SUMMARY OF THE INVENTION

Accordingly, it is an object of the present invention to provide for a novel and improved child carrier which is a combination stroller and carseat.

Another object of the present invention is to provide for a novel and improved combination stroller and carseat which can be incorporated into a molded plastic shell, requires a minimum number of parts and is simplified in construction and use.

A further object of the present invention is to provide for a novel and improved combination stroller and carseat which is lightweight, compact and is so constructed and arranged as to enable complete retraction and closure of the leg and wheel assembly into the seat unit when employed as a carseat.

It is an additional object of the present invention to provide for a a novel and improved combination stroller and car seat which is specifically adaptable for use in combination with a molded plastic shell to fully receive and enclose the front and rear wheels as well as to telescopingly receive the handle portion when converted from a stroller into a carseat.

In accordance with the present invention, a convertible carseat/stroller has been devised and is of the type including a unitary shell having a seat portion, back and armrest portions with a cavity formed within the shell, and the improvement comprises a wheel assembly including a wheel support member disposed in the cavity, a pair of front legs and a pair of rear legs extending downwardly from the support member and at least one of the pair of front and rear legs pivotally connected to the support member, pairs of front and rear wheels journaled to lower ends of the front and rear legs, respectively, and wheel release means being manually releasable to advance the pairs of front and rear legs and associated wheels between a lowered, downwardly divergent position extending beneath the shell and an upper retracted position within the cavity. Preferably, the shell also includes a lower extension enclosing the bottom of the shell and provided with movable hatches which will open to permit extension of the legs from the shell into the stroller position; and in returning to the retracted position within the shell, the hatches will move into a closed position to present a smooth exterior for convenient positioning of the carrier on a vehicle seat.

In the preferred form, both the front and rear legs are pivotal with respect to the support means and are guided between the extended and retracted positions by pivot links. In a modified form, the front legs are not pivotal but will undergo sliding advancement with the rear legs while maintaining the same attitude or angle with respect to the wheel support means.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a perspective view of a preferred embodiment of combination carseat and stroller apparatus and illustrated in the stroller mode, in accordance with the present invention;

FIG. 2 is a side view of the apparatus shown in FIG. 1 but illustrated in the carseat mode strapped onto a conventional vehicle seat;

FIG. 3 is another side view, partially in section of the preferred embodiment with the elements illustrated in full in the stroller position of FIG. 1 and in dotted form in the carseat mode as illustrated in FIG. 2;

FIG. 4 is a rear view of the preferred form of apparatus shown in FIG. 1;

FIG. 5 is a view in elevation of the bottom and rear of the apparatus as shown in FIG. 2;

FIG. 6 is a cross-sectional view taken about lines 7—7 of FIG. 5;

FIG. 7 is a front perspective view of the preferred form of apparatus shown in the carseat mode;

FIG. 8 is a detailed view of one of the rear wheels of the apparatus; and

FIG. 9 is a side view partially in section of a modified form of apparatus.

DETAILED DESCRIPTION OF THE PREFERRED EMBODIMENT

Referring in more detail to the drawings, there is illustrated in FIGS. 1 to 8 a preferred form of combination carseat and stroller apparatus 10 which is broadly comprised of a unitary molded shell 12, upper handle assembly 13 and front and rear wheel assemblies 14 and 15, respectively. The shell is formed to provide a seat portion 16, back portion 17, side armrest portions 18 and 19 and a lower unitary extension 20. The lower unitary extension 20 is generally bowl-shaped and provided with a front door panel or hatch 21 and a pair of rear door panels 22 which are in the open position as shown in FIG. 1 when the front and rear leg assemblies 14 and 15 are extended downwardly. In the carseat mode as shown in FIG. 2, the front and rear leg assemblies are retracted into the interior, downwardly directed cavity formed within the shell so as to be fully housed and the door panels 21 and 22 are returned to a closed position. In this way, any direct contact between the wheels and vehicle seat is avoided and, as shown in FIG. 2, the lower extension 20 of the shell 12 may then rest directly on the vehicle seat. In a conventional manner, a seat belt as designated at S may be extended through slots 24 in the armrest portions 18 and 19 to retain the apparatus in a position in facing relation to the upright portion of the vehicle seat V. Of course, this particular arrangement is given more for the purpose of illustration and not limitation and, for instance, the shell may be configured such that it can be fastened in a reverse direction to that shown in FIG. 2.

An important feature of the present invention resides in the wheel support means 25 and wheel release means 26 wherein the wheel support means 25 comprises an elongated fixed support unit made up of a pair of tubular support or track members 28 disposed in closely spaced, parallel relation to one another for downward extension along the cavity side of the back portion 17. Each of the tubular supports 28 extends downwardly through collar-like retainers 29 which are either molded as a unitary part of an outer peripheral, thickened flange 30 at the upper edge of the back portion 17 or rigidly affixed thereto. The lower ends of the tubular supports 28 are anchored in collar-like retainers 32 which are molded as a unitary part of the lower back portion of the shell. The wheel release means 26 is in the form of a yoke 33 which traverses the greater width of the shell and has a pair of openings 34 for insertion of the tubular supports 28 such that the yoke member 33 is free to move between the upper and lower retainers 29 and 32. Opposite lateral ends 35 of the yoke are aligned with upper ends of the front and rear wheel assemblies 14 and 15 which are pivotally connected to the ends 35 in a manner to be hereinafter described.

The yoke 33 also includes an intermediate pocket or recessed area 38 to receive a manually releasable clamping member 39 which is of generally channel-shaped configuration. Opposite ends or legs 40 of the member 39 are urged forwardly away from the intermediate portion 38 by coiled spring members 42, as best seen from FIG. 6, to bear against the back portion 17. A pair of ribs 44 extend along the back portion of the shell and terminate in opposite ends, for example, as indicated at upper ends 45 in FIG. 4, which are disposed in the path of movement of the clamping legs 40. Thus, the ribs 44 will prevent accidental sliding movement of the yoke between the raised and lowered positions. It is therefore necessary to manually squeeze or retract the clamping member 39 and its legs 40 outwardly a sufficient distance to clear the ribs 44 in order to slide the wheel release assembly 26 between the raised and lowered positions.

The front wheel assembly 14 includes a pair of tubular struts 48 pivotally connected at 49 to opposite ends of the yoke member 33. A fender-like cross brace 50 is fixed to the lower end of each strut 48 and carries a spring-loaded shaft 51 which extends upwardly from a bifurcated arm 52 for each front wheel 54. As such, the wheels 54 are self-centering for ease of retraction into the lower extension. The front wheel struts 48 are interconnected by the cross brace 50 which extends between the lower ends of the struts 48 and across the front end of the apparatus. The wheel assembly 14 is guided in its movement between the raised and lowered positions by a pair of pivot links 58, each link 58 having a fixed end 49 pivotally connected within the shell to the inside of an armrest portion and a movable end 53 pivotally connected to a lower portion of each respective strut 48 above the fender portion 50. When the wheel release assembly 26 is raised by the manual release member 39 as described, the pivot link 58 will undergo swinging movement in an arc from the downwardly extending vertical position, shown in full in FIG. 3, to an upwardly inclined position, shown dotted in FIG. 3, and with the lower wheel 54 moving upwardly into the cavity formed within each armrest portion 18.

The rear wheel assembly 15 is comprised of a pair of tubular struts 60, each being pivotally connected as at 61 to one end of the yoke 33 rearwardly of the pivotal connection 49 of the front struts 48. A rear wheel 62 is journaled directly to the lower end of each strut 60, and a cross brace designated at 64 interconnects the rear wheel struts for increased lateral stability. In order to guide the movement of the rear wheel assembly, a pivot link 66 includes a fixed pivotal end 67 which is pivotally connected to the underside of the shell adjacent to the lower end of the back portion 17 and a movable end 68 which is pivotally attached to an intermediate point on each strut 60. Accordingly, as the release assembly 26 is advanced upwardly to raise the wheel assemblies 14 and 15, the struts 60 will be guided from the extended position as shown in full in FIG. 3 to an upper retracted position, as shown dotted in FIG. 3, by the swinging movement of the pivot link 66 about the fixed pivotal end. In this way, the wheel assembly 62 will move into a position within the lower extension portion 20 of the shell so that the rear door panels 22 can be raised along with the front door panel 21 into a closed position fully enclosing the wheel assembly within the cavity.

As previously described, the unitary shell 12 is essentially in the form of a chair having the seat portion 16, backrest portion 17, side armrest portions 18 and 19 and a lower unitary extension 20 which encloses the lower end of the shell. As such, the interior cavity formed within the shell includes a relatively shallow portion as designated at 70 beneath the seat and relatively deep wells 71 and 72 beneath the armrest portions 18 and 19, respectively. The wells 71 and 72 continue upwardly along the rear area of the shell, and the back portion 17 is left open for convenient access to the wheel release means 26 and specifically the clamping member 39. The lower unitary extension 20 includes a flat base panel section 74, an upwardly inclined front panel section 75 for the door panel 21 and an upwardly and rearwardly inclined rear panel 76 in which the rear door panels 22 are mounted. The front panel 21 includes a hinge section as indicated at 77, and a flange 78 extends rearwardly from the hinge or pivot into the path of movement of the front crossbrace 50, as shown in FIG. 3. The front wheels 54 when extended downwardly and outwardly through the front door panel will bear directly against the panel 21 to force it into the extended position, as shown in FIG. 3, so as to act as a leg rest or support in that position; however, when the front wheels are raised, crossbrace 50 will move into engagement with the flange 78 to cause the door panel 21 to follow upward movement of the wheels into the closed position. The rear door panel 22 is hinged as at 80 for downward and forward movement in response to extension of the rear wheels 62. Similarly, when the wheels 62 are raised, they will move into engagement with a flange 82 so as to cause the door panel 22 to follow the upward movement of the rear wheels and move into a closed position covering the wheel, as shown in dotted form in FIG. 3.

The shell as described may be composed of various materials and, as illustrated in FIG. 6, is made up of a rigid inner plastic layer 84, an intermediate foam layer 85 and an outer fabric or padded layer 86. In addition to the slots 24 provided for the vehicle seat belt S, a shoulder harness 88 is incorporated into the shell in a conventional manner with the shoulder straps 88' shown in FIG. 1 extending forwardly through slots in the back portion 17 of the shell.

The handle section 13 includes an upper crossbar or handle grip 90 having a curved configuration corresponding to the curvature of the upper peripheral edge 30 of the back portion 17. Stem members 91 extend downwardly from the handle bar 90 through the tubular support portions 28, and spring-loaded buttons 92 are provided to control telescoping movement of the stems 91 through the supports 28 in a well-known manner. In this connection, a series of openings, not shown, may be provided along the length of the supports 28 for adjustable engagement with the spring-loaded buttons 92 to regulate the height of the handle section 13 above the shell or chair when in the stroller position. In the carseat mode, the buttons 92 are released to slide the handle stems 91 downwardly until the handlebar 90 moves into engagement with the upper edge 30 of the shell.

FIG. 8 illustrates in somewhat more detail than that shown in FIG. 1 a typical form of rear wheel unit 62 and which is comprised of a pair of wheels 62 journaled on a common shaft 95, the shaft extending through the lower end of each strut 60. A spoke 96 is carried on the shaft to cooperate with a braking member 97 which is pivotally mounted as at 98 and a cog 99 on the member 97 is caused to move into interengagement with the spokes 96 as illustrated to brake the stroller against movement. In use, and assuming that the unit is in the stroller mode as described, the braking unit can be selectively engaged by pressing down with the foot in order to brake the stroller against movement. Conversely, the braking unit may be disengaged by lifting up on the lower end of the member 97 with the foot until it is released from engagement.

When desired to convert into a carseat, the handle unit 13 is released by depressing the buttons 92 and sliding the legs or stem members 91 downwardly until the handlebar 90 engages the upper end of the shell, as illustrated in FIG. 7. The clamping member 39 is then manually engaged to release the yoke member 33 and permit it to advance from the lowered position shown in FIG. 4 to that illustrated in FIG. 5. In the course of advancement, the front and rear wheel assemblies 14 and 15 will advance upwardly through the bottom panel into the retracted position illustrated in FIG. 3, and the door panels 21 and 22 will follow the upward movement of the wheels 54 and 62 and move into closed positions forming a smooth uninterrupted continuation of the bottom panel 74. The child may be left in the stroller as it is converted into the carseat mode and then placed on the seat of the vehicle, as illustrated in FIG. 2. The child is then strapped in the carseat in a conventional manner using the safety harness 88 and by passing the seat belt S through the slots 24 in the armrests 18 of the shell. As indicated earlier, the illustrated shell configuration disclosed is intended for use as a carseat in which the child is buckled in in a direction facing the rear of the vehicle to conform to Federal and State safety regulations. Nevertheless, it will be apparent that by appropriate modification of the shell it may be so constructed and arranged as to face in a forward direction on the automobile seat. In order to convert the carseat into a stroller, it is necessary merely to follow the reverse procedure to that described for conversion into a carseat.

DETAILED DESCRIPTION OF A MODIFIED FORM OF INVENTION

A modified form of child carrier 10' is illustrated in FIG. 9 and wherein like parts are correspondingly enumerated to that of the preferred embodiment of FIGS. 1 to 8. Once again, the carrier comprises a unitary shell 12', upper handle section 13' with a seat portion 16', back portion 17' and armrest portions 18' on opposite sides of the seat and back portions. Front and rear door panels 21' and 22' are provided in lower unitary extension 20'. The modification resides in the construction and arrangement of front and rear wheel assemblies 100 and 102, respectively, which are disposed for advancement between the lowered stroller position as shown in FIG. 9 and a raised retracted position within the shell as in the preferred form. In addition, wheel support means 25' comprises support tubes 28' for telescoping engagement with the downwardly extending stems 91' of the handle section; however, wheel release means 26' comprises a modified form of yoke member 104 which in a manner similar to the yoke member 33 traverses the substantial width of the back portion 17' and has openings, not shown, to receive the tubular support members 28' of the wheel support means. Opposite ends of the yoke 104 curve downwardly and forwardly into tubular strut members 106 for the front wheel assembly, and the upper ends of the struts 106 are supported by rollers 108 which are fastened to opposite sides of the back portion of the shell within the cavity.

The lower ends of the struts 106 are provided with a fender-like extension 110 and ground engaging wheels 112 are journaled for rotation from the extension 110. The rear wheel assembly includes rearwardly inclined tubular struts 114 pivoted as at 115 to the underside of the yoke member 104. The pivot link 116 is provided for each of the rear struts 114 and includes an upper pivotal end 117 in fixed pivotal relation to the underside of the back portion 17' and a lower pivotal end 118 pivotally connected to an intermediate portion of the rear strut 114. Conventional ground-engaging wheels 120 are journaled to lower ends of the struts 114.

Although not shown, the yoke member 104 is provided with a wheel release corresponding to the wheel release member 39 of the preferred form. When engaged to permit upward movement of the yoke 104 along the support tubes 28', the rear wheel assembly will slide upwardly with the yoke member as it is caused to swing inwardly and upwardly about the fixed pivot 117 into a position substantially parallel to the support tubes 28', and the wheels 120 move into the relatively deep well portions of the cavity on either side of the seat and back portions. In turn, the front leg assembly will advance upwardly along with the yoke member 104 while maintaining the same angular relationship to the support members 28' until the front wheels 112 also have moved completely within the side well portions of the cavity. The door panels 21' and 22' may follow the upward movement of the wheels into the closed position in a similar manner to that described with reference to the preferred form. Also, the operation of the wheel assemblies of the modified form is the same as that described with reference to the preferred form. The major distinction is the fact that the pivotal mounting of the front legs in the preferred form offers greater latitude in the movement of the front leg assembly and added structural support as provided by the pivot link 58.

It is therefore to be understood that various modifications and changes may be made in the preferred and modified forms of invention as herein set forth and described without departing from the spirit and scope of the invention as defined by the appended claims and reasonable equivalents thereof.

I claim:

1. In a convertible carseat and stroller wherein a unitary shell includes a seat portion, a rearwardly inclined back portion and armrest portions with a downwardly directed cavity within said shell, the improvement comprising:
a wheel assembly including an elongated wheel support member in said cavity and extending substantially parallel to said back portion, pairs of front and rear legs extending downwardly from said support member and at least one of said pairs of front and rear legs being pivotal with respect to said support member, pairs of front and rear wheels journaled to lower ends of said pairs of front and rear legs, respectively, and release means connected between said pairs of front and rear legs and said wheel support member for advancing said pairs of front and rear legs and associated wheels between a lowered, downwardly divergent stroller position extending beneath said shell and an upper retracted position within said cavity.

2. In a carrier according to claim 1, said wheel support member being in the form of an elongated fixed support member along said back portion and within said cavity, and said wheel release means being releasable for slidable movement along said wheel support.

3. In a carrier according to claim 2, including guide means between said rear legs and said wheel support member causing said rear legs to be folded into a position in substantial alignment with said wheel support member when in the retracted position.

4. In a carrier according to claim 3, said guide means defined by pivot links between said rear legs and said wheel support member.

5. In a carrier according to claim 1, said wheel support member including a pair of elongated track members extending in spaced parallel relation to one another along said back portion of said shell, and a handle member extending rearwardly and upwardly from said shell including downwardly extending legs telescopingly mounted with respect to said track members.

6. In a convertible carseat and stroller wherein a unitary shell includes a seat portion, upwardly extending back portion, armrest portions, and a cavity within said shell, the improvement comprising:
a wheel assembly including a wheel support member extending along said back portion of said shell, a pair of front and rear legs extending downwardly from said support member and at least one of said pair of front and rear legs being pivotal with respect to said support member, pairs of front and rear wheels journaled to lower ends of said pairs of front and rear legs, respectively, and a release member connected between said pairs of front and rear legs and said wheel support member to advance said pairs of front and rear legs between a lowered, downwardly divergent position extending beneath said shell for use as a stroller and an upper retracted position within said cavity for use as a carseat.

7. In a convertible carseat and stroller according to claim 6, said wheel support member including an elongated fixed track member, said wheel release member being releasable for slidable movement along said wheel support means, and guide means between said rear legs and said wheel support member causing said rear legs to be folded into a position in substantial alignment with said wheel support member when in the retracted position.

8. In a convertible carseat and stroller according to claim 6, said wheel release means being slidable with respect to said wheel support member, and said front leg members remaining in substantially fixed relation to said wheel release means when advanced with said rear legs between said extended and retracted positions, said wheel support member including a pair of elongated tubular members extending in spaced parallel relation to one another along said back portion of said shell, said wheel release means including a yoke slidably disposed on said wheel support means, and a spring-loaded clamping member on said yoke.

9. In a convertible carseat and stroller according to claim 8, said front leg members mounted in fixed relation to said yoke outboard of said wheel support means.

10. In a convertible carseat and stroller according to claim 8, including a handle member extending rearwardly and upwardly from said shell including downwardly extending legs telescopingly mounted with respect to said tubular members.

11. In a convertible carseat and stroller wherein a unitary shell includes a seat portion, back and armrest portions with a downwardly directed cavity within said shell, the improvement comprising:

a wheel assembly including wheel support means in said cavity, pairs of front and rear legs extending downwardly from said support means said pairs of front and rear legs being connected to a yoke, pairs of front and rear wheels journaled to lower ends of said pairs of front and rear legs, respectively, and wheel release means being manually releasable to advance said pairs of front and rear legs and associated wheels between a lowered, downwardly divergent stroller position extending beneath said shell and an upper retracted position within said cavity, said wheel release means being slidable with respect to said wheel support means, and said front leg members remaining in substantially fixed relation to said wheel release means when advanced with said rear legs between said extended and contracted positions, said wheel support means defined by a pair of elongated members extending in spaced parallel relation to one another within said cavity along said back portion of said shell, said wheel release means including said yoke slidably disposed on said wheel support means, and a spring-loaded clamping member on said yoke normally urged in a direction bearing against said back portion to prevent slidable movement of said yoke with respect to said wheel support means.

12. In a carrier according to claim 11, including rib members on said back portion in the path of movement of said spring-loaded clamping member.

13. In a convertible carseat and stroller wherein a unitary shell includes a seat portion, back and armrest portions and a cavity within said shell, the improvement comprising:

a wheel assembly including a wheel support member in said back portion of said shell, a pair of front and rear legs extending downwardly from said support member and at least one of said pair of front and rear legs being pivotal with respect to said support member, pairs of front and rear wheels journaled to lower ends of said pairs of front and rear legs, respectively, and a wheel release member interconnecting said pairs of front and rear legs to said wheel support member including means to advance said pairs of front and rear legs between a lowered, downwardly divergent position extending beneath said shell for use as a stroller and an upper retracted position within said cavity for use as a carseat, said unitary shell including a bottom panel defining a unitary extension of said shell in spaced relation beneath said seat portion, and front and rear door panels in said bottom panel.

14. In a convertible carseat and stroller according to claim 13, including means pivotally mounting said door panels with respect to said bottom panels for movement between an open position when said wheel assembly is extended for use as a stroller and a closed position when said wheel assembly is retracted within said cavity for use as a carseat.

* * * * *